(12) United States Patent
Broderick et al.

(10) Patent No.: US 9,593,609 B2
(45) Date of Patent: Mar. 14, 2017

(54) SYSTEM AND METHOD FOR UREA DECOMPOSITION TO AMMONIA IN A SIDE STREAM FOR SELECTIVE CATALYTIC REDUCTION

(71) Applicants: Jeffrey Michael Broderick, Ridgefield, CT (US); Kathryn V. O'Leary, Southbury, CT (US); R. Gifford Broderick, Wilton, CT (US); John N. Dale, Stratford, CT (US); James M. Valentine, Fairfield, CT (US)

(72) Inventors: Jeffrey Michael Broderick, Ridgefield, CT (US); Kathryn V. O'Leary, Southbury, CT (US); R. Gifford Broderick, Wilton, CT (US); John N. Dale, Stratford, CT (US); James M. Valentine, Fairfield, CT (US)

(73) Assignee: PEERLESS MFG. CO., Dallas, TX (US)

(*) Notice: Subject to any disclaimer, the term of this patent is extended or adjusted under 35 U.S.C. 154(b) by 483 days.

(21) Appl. No.: 14/045,449

(22) Filed: Oct. 3, 2013

(65) Prior Publication Data
US 2014/0096532 A1     Apr. 10, 2014

Related U.S. Application Data

(60) Provisional application No. 61/710,509, filed on Oct. 5, 2012.

(51) Int. Cl.
*F01N 3/08*     (2006.01)
*F02C 6/18*     (2006.01)
(Continued)

(52) U.S. Cl.
CPC ............ *F01N 3/0814* (2013.01); *F02C 6/18* (2013.01); *F23J 15/003* (2013.01); *F23J 15/02* (2013.01);
(Continued)

(58) Field of Classification Search
CPC ... F01N 3/0814; F01N 2610/02; F23J 15/003; F23J 15/02; F23J 15/10;
(Continued)

(56) References Cited

U.S. PATENT DOCUMENTS 5,282,355 A * 2/1994 Yamaguchi ........ B01D 53/8631
                                                                    60/39.182
5,296,206 A    3/1994 Cho et al.
(Continued)

*Primary Examiner* — Andrew Nguyen
(74) *Attorney, Agent, or Firm* — Andrews Kurth Kenyon LLP

(57) ABSTRACT

A method for reducing NOx emissions in the exhaust of a combined cycle gas turbine equipped with a heat recovery boiler and a catalyst effective for NOx reduction, wherein a slip stream of hot flowing exhaust gases is withdrawn from the primary gas flow after the catalyst at a temperature of 500° F. to 900° F. and directed through a fan to a continuous duct into which an aqueous based reagent is injected for decomposition to ammonia gas and the outlet of the continuous duct is connected to an injection grid positioned in the primary exhaust for injection of ammonia gas into the primary exhaust stream at a location upstream of the catalyst.

13 Claims, 2 Drawing Sheets

(51) Int. Cl.
*F23J 15/02* (2006.01)
*F23J 15/00* (2006.01)

(52) U.S. Cl.
CPC ........ *F23J 2215/10* (2013.01); *F23J 2219/10* (2013.01); *Y02E 20/16* (2013.01)

(58) Field of Classification Search
CPC ...... F23J 15/101; F23J 2219/10; Y02E 20/16; Y02E 20/326; B01D 53/8625; B01D 53/90; B01D 2251/2062; B01D 2251/2067; F02C 6/18
See application file for complete search history.

(56) References Cited

U.S. PATENT DOCUMENTS

| | | |
|---|---|---|
| 5,555,718 A | 9/1996 | Anderson et al. |
| 5,660,799 A * | 8/1997 | Motai ................. B01D 53/343 |
| | | 122/470 |
| 5,809,774 A | 9/1998 | Peter-Hoblyn et al. |
| 5,968,464 A | 10/1999 | Peter-Hoblyn et al. |
| 6,203,770 B1 | 3/2001 | Peter-Hoblyn et al. |
| 7,090,810 B2 | 8/2006 | Sun et al. |
| 7,615,200 B2 | 11/2009 | Lin et al. |
| 7,815,881 B2 | 10/2010 | Lin et al. |
| 7,829,033 B2 * | 11/2010 | Sun ................... B01D 53/8631 |
| | | 422/168 |
| 8,220,274 B2 | 7/2012 | Bono et al. |
| 8,734,745 B2 | 5/2014 | Schroeder |
| 2004/0057888 A1* | 3/2004 | Buzanowski ...... B01D 53/8631 |
| | | 423/235 |
| 2010/0052333 A1* | 3/2010 | Andrews ................. F02C 3/20 |
| | | 290/1 A |

* cited by examiner

SYSTEM AND METHOD FOR UREA DECOMPOSITION TO AMMONIA IN A SIDE STREAM FOR SELECTIVE CATALYTIC REDUCTION

FIELD OF THE INVENTION

The present invention relates generally to the reduction of nitrogen oxide (NOx) emissions from small industrial, commercial and electric utility boilers and other lean burn stationary combustion sources, especially combined cycle gas turbines with an associated heat recovery boiler. More particularly, the present invention relates to a system and method in which urea is converted to ammonia for use in NOx reduction by selective catalytic reduction (SCR). The present invention is particularly applicable to those combustors know in the art as combined cycle gas turbines with heat recovery boilers.

BACKGROUND OF THE INVENTION

The reduction of nitrogen oxide ("NOx") emissions from small industrial, commercial and electric utility boilers, gas turbines, and other lean burn stationary combustion sources continues to be a challenge. Primary measures, such as low NOx burners, flue gas recirculation, water injection, fuel staging or air staging, need to balance the impact on the efficiency and stability of combustion with the level of NOx reduction obtained and the risk of increases in other regulated pollutants, such as carbon monoxide or unburned hydrocarbons. Secondary measures, including selective non catalytic reduction (SNCR) and selective catalytic reduction (SCR), involve the injection of reagents, such as ammonia or urea, into the upper furnace or the flue gases to chemically convert NOx to elemental nitrogen.

Ammonia reagent is regulated as a hazardous substance, which has driven many end users to consider aqueous urea reagent as an alternative. While aqueous urea is not a hazardous substance, its application for NOx reduction requires additional design effort to make certain that the urea is fully gasified and does not leave intermediate solid by products that can foul surfaces and reduce chemical utilization.

In converting urea to ammonia for use in NOx reduction by SCR, the art generally teaches the injection of urea into a heated vaporizer or a flowing side stream of hot combustion gases and/or heated air to gasify the urea for subsequent distribution upstream of a NOx reduction catalyst.

The art teaches the bypass of combustion gases around a heat exchanger sections in a boiler to provide heat for gasification of urea to ammonia without unwanted byproducts. In that case some of the flue gas heat enthalpy used in generating steam and power is lost as the portion of hot gases extracted for urea decomposition does not pass through the heat exchanger but is bypassed around it and later returned to the main gas stream.

In other cases the art teaches the decomposition of urea to ammonia in a flowing side stream of gases that can utilize hot flue gas or supplemental firing of fuel to heat the gases or ambient air for urea decomposition on large-scale combustors. The art prescribes a residence time of 1-10 seconds for the decomposition of urea to ammonia. That does not address the needs of small combustion sources where small quantities of ammonia are needed and where smaller decomposition reactors and shorter residence times would be advantageous.

Yamaguchi, in U.S. Pat. No. 5,282,355, describes the prior art as using NOx free exhaust extracted by an exhaust gas recirculation fan to vaporize aqueous ammonia in a vaporizer from which it is injected into the flue upstream of a catalyst layer via an ammonia vapor pipe. He identifies aqueous urea as a precursor to aqueous ammonia which can also be vaporized by NOx free exhaust. For aqueous based solutions of ammonia, Yamaguchi suggests that 0.5-1.0 seconds are required to vaporize the ammonia solution and Yamaguchi does not address the time required for complete decomposition and gasification of an aqueous solution of urea.

Yamaguchi identifies concerns about the formation and deposition of solids from the reaction of ammonia with other exhaust gas species and so proposes using superheated steam from the boiler or other source to provide the heat to vaporize the aqueous ammonia or its precursor in a vaporizer. However, the use of steam from a boiler has a penalty associated with removing steam from the heat or power generation process and also with the cost of preparing de-mineralized boiler makeup water to replace the steam used in the vaporization of the aqueous ammonia or its precursor.

Peter-Hoblyn et al., in U.S. Pat. No. 5,809,774, describe the use of SCR for NOx reduction from lean burn engines in conjunction with fuel treatment using oil and water emulsions for a portion of the NOx reduction. Peter-Hoblyn et al. suggest that for SCR, especially at high loads, it is sometimes practical to introduce the aqueous solution of NOx reducing reagent into a slip stream (less than all, e.g., 5-25%) of the exhaust gases to achieve gasification of the reagent prior to mixing with the major or entire portion of exhaust gases.

In U.S. Pat. Nos. 5,968,464 and 6,203,770, Peter-Hoblyn et al. teach that the injection of aqueous urea into a pyrolysis chamber with droplets of under 500 micron, and preferably under 100 micron, will facilitate complete gasification of urea prior to introduction into the exhaust gases and allow close coupling of the pyrolysis chamber and SCR catalyst. The use of a return flow injector is proposed to cool the injector and prevent solids from plugging the injector. The pyrolysis chamber of Peter-Hoblyn et al. is described in the specification and shown in the drawings as a small heated chamber with discrete holes disposed in the primary exhaust stream or as a foraminous structure that allows aqueous urea that has been gasified to ammonia in the chamber to escape into the flue gases and flow across a downstream SCR catalyst.

Peter-Hoblyn et al., however, do not describe how to prevent plugging of the compact pyrolysis chamber with urea decomposition products, especially at higher urea injection rates. Additionally, it is difficult to see how complete gasification of urea is accomplished in the pyrolysis chamber described by Peter-Hoblyn et al. While the process of Peter-Hoblyn et al. may work for low urea injection rates on the order of 10-25 grams/minute as required for passenger car diesel engines, it is not apparent how this approach would scale up for higher injection rates of 50-1000 grams/minute or greater, as often required for small stationary combustion sources.

Cho et al., in U.S. Pat. No. 5,296,206, describe the prior art as teaching the use of a flue gas slip stream drawn by a blower into a vaporizer vessel where the flue gas mixes and vaporizes aqueous ammonia, and also describes the use of an electric heater to heat ambient air and mix it with aqueous ammonia in a vessel, thus vaporizing the aqueous ammonia. Cho et al. identify both aqueous ammonia and urea as known reducing agents. Cho et al. propose using a heat exchanger in the flue gas to transfer heat to a heat transfer medium, such as ambient air, which is heated to 400° F.-950° F. and used to vaporize aqueous ammonia that is sprayed with an air assisted injector into a vaporizer vessel and from which vaporized reagent is then injected into the flue gas across a catalyst. Cho et al. avoid the need for external electricity or steam for vaporization but do not describe how the temperature in the vaporizer will be maintained at low loads and low flue gas temperatures across the heat exchanger, especially with the cooling effect of the aqueous reagent and atomizing air injected into the vaporizer.

In U.S. Pat. Nos. 7,615,200 and 7,815,881 directed at large scale combustors, Lin et al. teach that a side stream can be generated by bypassing some portion of flue gases around a heat exchanger surface, such as an economizer, into which aqueous urea can be injected and gasified prior to forming a combined stream across a catalyst. In U.S. Pat. No. 7,815,881, Lin et al. describe the bypass flow as less than 10% of the combustion gases. Obviously the overall combustor efficiency would be negatively affected if this large quantity of flue gas were bypassed around a heat exchanger. Lin et al. teach that at high loads with high temperatures the bypass damper can be closed; however, at low loads with low gas temperatures Lin et al. do not describe how this large quantity of bypassed gas would efficiently be brought up to a temperature sufficient for urea gasification.

Sun et al., in U.S. Pat. Nos. 7,090,810 and 7,829,033, describe a process for reducing NOx from a large-scale combustor involving a side stream of gases or heated ambient air into which urea is injected for decomposition and then introducing the side stream into a primary stream for NOx reduction across a catalyst. Sun et al. specifically teach that residence times of 1-10 seconds are required to effectively evaporate the water and gasify the urea such that solid byproducts do not foul the distribution pipes, ammonia injection grid ("AIG") or catalyst or heat transfer surfaces. Supplemental heat from a burner, steam coil heater or other source can be utilized. These patents are generally directed at large combustors and describe the need for sophisticated vessel design for the side stream using computational fluid dynamic ("CFD") modeling techniques.

Fuel Tech Inc. has commercially marketed a system called the ULTRA™ process which generally uses a burner to decompose large quantities of urea to ammonia for large-scale combustors and a related product called ULTRA-5™ for smaller applications which uses an electric heater to heat ambient air for urea conversion. In many applications, a burner requires an additional permit to operate. The use of ambient temperature atomizing air for the air atomized injector of the Fuel Tech processes can represent as much as 8% of the overall air through the decomposition chamber. That cooler air combined with the cooling effect of introducing aqueous urea into the decomposition chamber can result in an outlet temperature from the decomposition chamber that is under 600° F. and well below the minimum 650° F.-700° F. outlet temperature range which Applicants have found to be desirable. That can lead to incomplete decomposition of urea and/or to the need for the longer residence times as proposed by Sun et al.

The Sun et al. patents cited above, assigned to Fuel Tech Inc., generally teach 1-10 seconds residence time for complete gasification of urea before introduction into the bulk gas stream. However, Applicants have discovered that by balancing gas flow through the decomposition duct, temperature in the duct, urea injection rate and urea spray quality, the residence time requirement for complete urea gasification can be reduced to under 1 second, which may be desirable in certain circumstances.

The marketplace has been looking for a simple, cost effective and reliable method of converting urea to ammonia on small combustion systems where only small quantities of aqueous reagent are required to be gasified. The prior art would lead one to believe that complex vaporizer systems, decomposition vessels designed with CFD, heat exchangers inserted in the flue gas, steam extraction from a boiler, high secondary power requirements to heat ambient air above the reagent decomposition temperature or large side stream ducts with bypass dampers and long residence times are required to reliably vaporize even small quantities of aqueous urea to generate ammonia gas for SCR.

To the contrary, however, the present invention provides a method and apparatus that controls the rate of gas flow through the decomposition duct, maintains temperature in the duct, precisely controls the urea injection rate as a function of combustor load, targets and maintains urea spray quality without additional ambient atomizing air and reduces the residence time requirement for evaporation and gasification to under 1 second while minimizing the need for external power.

Combined cycle gas turbines fired by natural gas or petroleum based fuels represent an efficient combustion system for generating power. Due to the high exhaust temperatures and large volume of combustion gases the gas turbine is often combined with a heat recovery steam generator (HRSG) and a steam turbine to provide additional electricity and improved system efficiency. Combustion turbines with the high combustion temperatures and high excess air also produce a significant quantity of nitrogen oxide emissions. Thus even with the low concentration of emissions as measured in parts per million (ppm), the mass of NOx emissions can be high from a combustion turbine. The art has explored the use of SCR on both combined cycle and simple cycle turbines to reduce the NOx emissions. Most of the SCR applications on either simple cycle or combined cycle turbines use ammonia as the reagent and require high temperature vaporizers to convert the aqueous ammonia to an ammonia gas for injection upstream of the SCR catalyst.

Anderson et al., in U.S. Pat. No. 5,555,718, teach a method of injecting a reagent, such as urea or ammonia, into the expanding transition section at the inlet of the HRSG that receives the exhaust from the turbine. Arranged in the expanding transition section are low profile injection pipes for injecting the reagent into the exhaust ahead of a catalytic reactor section. Anderson et al. do not address the fact that many combined cycle turbines have a carbon monoxide catalyst positioned in the high temperature inlet section of the HRSG to oxidize CO in the exhaust to $CO_2$. Reducing agents, such as ammonia, that are injected upstream of the CO catalyst would be oxidized to NOx across the CO catalyst.

Buzanowski, in U.S. Patent Application Publication No. 2004/0057888 A1, now abandoned, teaches the use of a blower fan using hot air or exhaust gas to vaporize aqueous ammonia in a vaporizer to feed an ammonia injection grid positioned in the primary exhaust upstream of an SCR reactor for NOx reduction. A plurality of adjustable valves can be used to adjust the ammonia distribution rate from ammonia distribution pipes by adjusting the amount of hot carrier gas to each injection pipe or section of pipes.

SUMMARY OF THE INVENTION

In accordance with one aspect of the present invention, a system and method is provided for reducing NOx emissions from the exhaust of a combined cycle gas turbine equipped with a heat recovery boiler. A plurality of heat exchanger sections are spatially separated from one another in a direction of flow of primary exhaust gases, the plurality of heat exchanger sections including at least a first heat exchanger section and a second heat exchanger section. A catalyst effective for NOx reduction is provided downstream of the second heat exchanger section and an injection grid is provided downstream of the first heat exchanger section and upstream of the second heat exchanger section. The primary exhaust gases flow over the first heat exchanger section, then the injection grid, then the second heat exchanger section and then the catalyst. A slip stream of the primary exhaust gases is withdrawn from a location downstream of the catalyst at a temperature of 500° F. to 900° F. and through a fan or blower to a continuous duct. An aqueous based reagent is injected into the slip stream flowing through the continuous duct such that the aqueous based reagent decomposes to ammonia gas. The slip stream, carrying the ammonia gas, is injected into the flow of primary exhaust gases through the injection grid, whereby a mixture of the slip stream, carrying the ammonia gas, and the primary exhaust gases are caused to flow over the catalyst.

In some embodiments, a residence time in the continuous duct is less than one second from the point of reagent injection into the continuous duct to the point of injecting the slip stream, carrying the ammonia gas, into the flow of primary exhaust gases. In some embodiments, a portion of the slip stream comprises gases repeatedly re-passed over the second heat exchanger section. In certain of these embodiments, no heat exchange section of the combined cycle gas turbine equipped with a heat recovery boiler is bypassed by the gases withdrawn in the slip stream.

In some embodiments, the gases withdrawn in the slip stream are heated upstream of the point of reagent injection and downstream of the fan or blower. In certain of these embodiments, the gases withdrawn in the slip stream are heated such that the gases in the continuous duct maintain a temperature above 650° F. immediately downstream of the point of reagent injection.

In some embodiments, the aqueous based reagent is a 25-50% aqueous solution of urea. In some embodiments, the aqueous based reagent is an aqueous based ammonia solution of 19-30%. In some embodiments, a plurality of decomposition ducts are connected to the injection grid, each decomposition duct having at least one injector and each decomposition duct being connected to at least one injection lance on the injection grid.

In another aspect of the present invention, a method for reducing NOx emissions in the exhaust of a combined cycle gas turbine equipped with a heat recovery boiler and a catalyst effective for NOx reduction is provided, wherein a slip stream of hot flowing exhaust gases is withdrawn from the primary gas flow after the catalyst at a temperature of 500° F. to 900° F. and directed through a fan to a continuous duct into which an aqueous based reagent is injected for decomposition to ammonia gas and the outlet of the continuous duct is connected to an injection grid positioned in the primary exhaust for injection of ammonia gas into the primary exhaust stream at a location upstream of the catalyst.

DETAILED DESCRIPTION OF THE INVENTION

Figure 1:
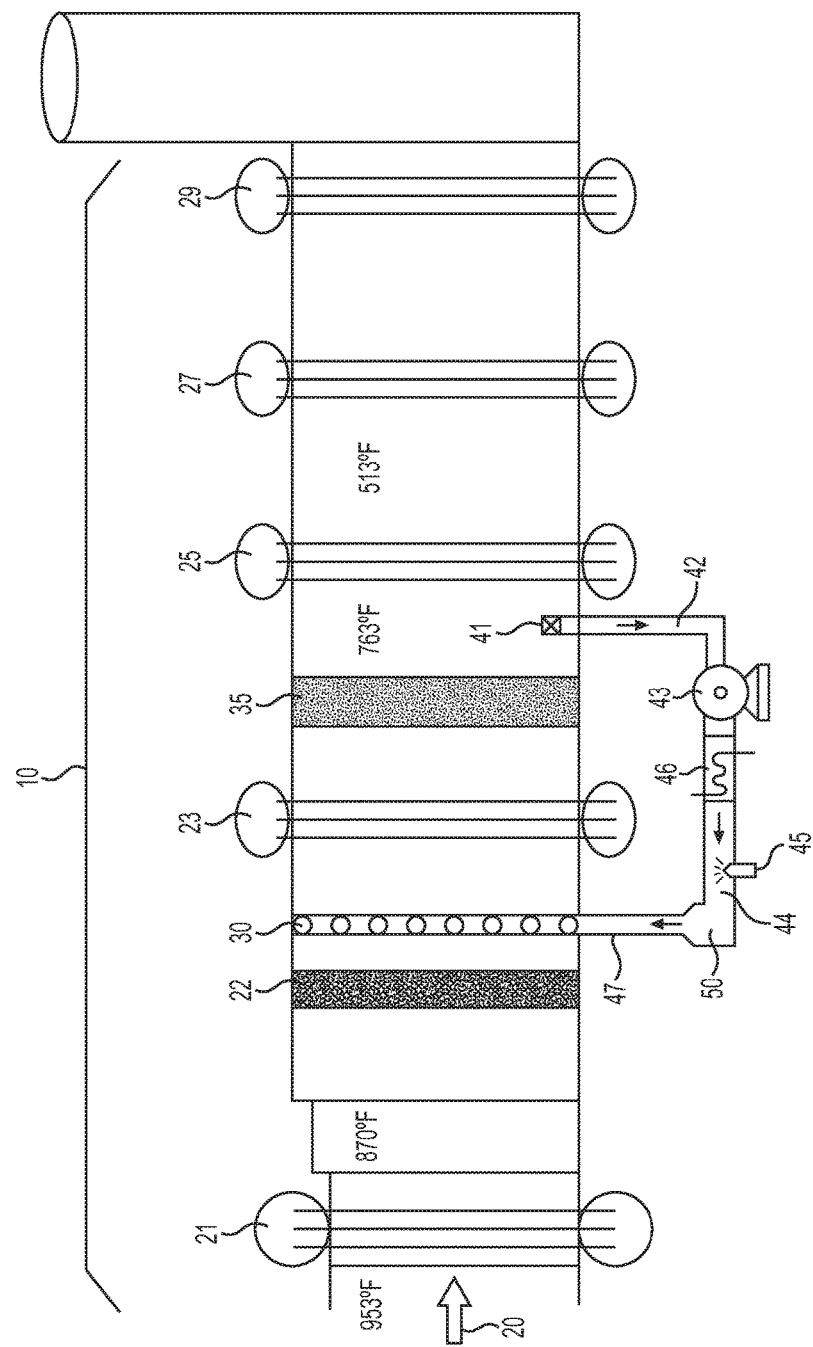
FIG. 1 is a schematic cross-sectional view of the present invention.

FIG. 1 illustrates a multi section heat recovery steam generator (HRSG) (10), such as those commonly used in a combined cycle combustion turbine to recover energy from hot exhaust gas at the turbine outlet. The temperature of the exhaust gases (20) out of the turbine is 953° F. at full load and decreases along the length of the HRSG as heat is extracted by the heat recovery sections. Also disposed in the HRSG after the first heat recovery section (21) at a temperature of 870° F. is an oxidation catalyst (22) effective for CO oxidation, and an ammonia injection grid (AIG) (30) for introducing a NOx reducing agent into the primary exhaust gas flow.

Following the second heat exchanger section (23) an SCR catalyst (35) is installed in the HRSG where the temperature is 763° F. and typical ranges from 600° F. to 850° F. Following the SCR catalyst (35) are additional sections for heat recovery (25-29). NOx from the turbine exhaust can be reduced through the SCR catalyst (35) using the present invention to convert aqueous urea reagent to ammonia gas through the use of a slip stream of hot exhaust gas to decompose and gasify the urea to ammonia for injection through the AIG (30).

The current invention involves withdrawal of a slip stream of hot flue gases at a point (41) after the second heat exchanger section (23) in the HRSG and following the SCR catalyst (35) and at a location before a third heat exchanger section (25). The hot gas slip stream is used in the gasification of aqueous urea to ammonia in a continuous decomposition duct (42). The gasified urea reagent is then injected into the cavity formed after the first heat exchanger (21) and CO catalyst (22) and before the second heat exchanger (23) through the ammonia injection grid (AIG) (30). In this manner the extracted slip stream of flue gases are re-passed by the second heat exchanger section (23) and no hot flue gases are bypassed around a heat exchanger, thus minimizing heat and efficiency losses from the HRSG.

The choice of catalyst will depend upon the optimum gas temperature for a particular SCR catalyst (35) and the specific HRSG configuration. Vanadium based SCR catalysts typically perform best at temperatures 600° F. to 800° F. while zeolite based catalysts perform best at higher temperatures of 850° F. to 1025° F.

It is believed to be a novel feature of the present invention that there is a minimum of wasted flue gas enthalpy as the gases withdrawn in the slip stream at point (41) after the second heat exchanger (23) and used for urea decomposition are returned to primary gas stream through the AIG (30) and are thereby re-passed through the second heat exchanger (23) and no heat exchanger surface is bypassed. The residence time required for urea decomposition as measured from the point of urea injection into the decomposition duct to the point of ammonia injection into the primary gas stream can be maintained below 1 second when the side stream of flue gas used for urea decomposition is above 750° F. upstream from the urea injection point and the quantity of urea solution to be gasified is 1 to 10 gallons per hour of a 32% solution of urea in water and the corresponding slip stream gas flow rate is 150-3000 scfm.

EXAMPLE

On a 25 MW gas fired gas turbine the uncontrolled NOx is 42 ppm and control to 2.5 ppm is required. That requires the injection and the decomposition of 7 gallons per hour of 32% urea solution. Hot gases exit the turbine at 953° F. and enter a first high-pressure heat exchanger section (21) of the HRSG. Following the first high pressure heat exchanger section (21) the gases are at a temperature of 870° F. and enter a second heat exchanger section (23). Disposed between the first heat exchanger section (21) and the second heat exchanger section (23) is an ammonia injection grid (AIG) (30) composed of multiple ammonia gas injection pipes with multiple injection orifices on each pipe.

Figure 2:
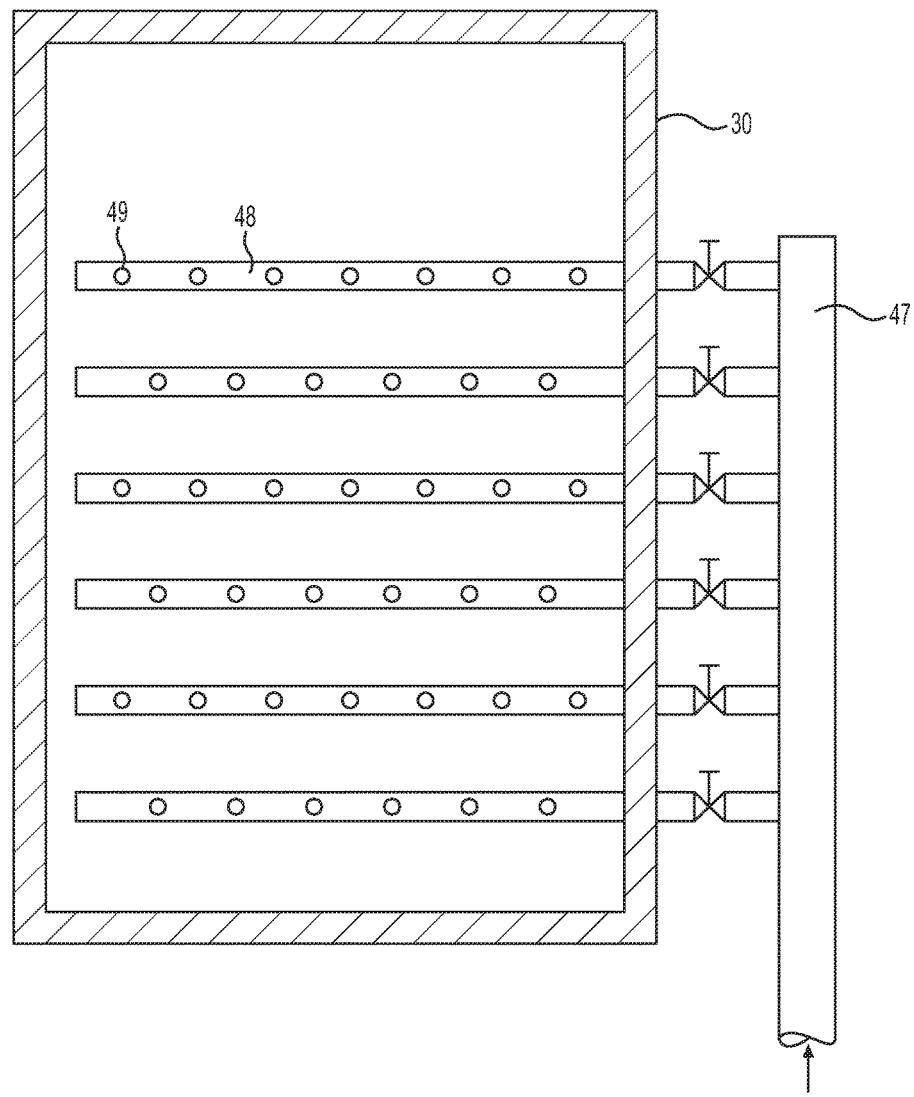
FIG. 2 is a schematic cross-sectional view of an ammonia injection grid (AIG) portion of the present invention shown in FIG. 1.

FIG. 2 presents a typical AIG (30) well know to those skilled in the art. Following the second heat exchanger section (23) the gas temperature is 763° F. In a cavity following the second boiler heat exchanger (23) is disposed an SCR catalyst (35) selected for optimum NOx reduction in a window of 600° F. to 850° F. Following the SCR catalyst (35) a slip stream of flue gas is withdrawn from the primary exhaust duct at (41) into a continuous decomposition duct (42) and represents approximately 0.5-2% of the primary flue gas volume.

The flowing side stream at 763° F. is drawn off by a fan or a blower (43) and is ducted to a reagent injection portion of the continuous duct (44) having an inlet end and an outlet end and typically configured as a round horizontal duct. Urea is injected into the injection portion of the duct (44) proximate the inlet end using at least one injector (45). In some cases it may be advantageous to introduce ambient air, water tempering, cooler flue gas or other means to maintain the side stream temperature to the fan or blower (43) at 750° F. which will reduce the cost of materials for the fan or blower (43). In other cases a supplemental heater (46) is employed after the fan or blower (43) and prior to the injection portion of the continuous duct (44) to maintain the side stream temperature at the injection point at 750° F. or greater.

In U.S. Pat. No. 7,467,749, Tarabulski et al. describe a preferred type of return flow injector although other injectors that produce average droplets of 25-75 micron diameter can be used with or without low volumes of atomizing or cooling air and with or without return flow.

The urea is gasified in the decomposition portion (50) of the duct (42) to generate ammonia gas through thermal decomposition by the hot flowing side stream of combustion gas. From the decomposition portion (50) of the duct (42) the gasified urea reagent is ducted to an AIG distribution pipe (47) with a plurality of lances (48) running horizontally across the primary gas flow duct between the first heat exchanger (21) and the second heat exchanger (23). Each lance (48) of the AIG (30) may, in turn, have multiple additional fingers (49) in the flowing gas path. Each of the lances or fingers may have a number of exit ports from which the ammonia gas is released into the primary gas stream under pressure from the side stream fan or blower (43). Other known arrangements of AIG pipes can also be used.

The gasified reagent is injected through the AIG (30) and mixes with the primary gas stream before passing through the second heat exchanger section (23) and then the SCR catalyst (35) where NOx is reduced. This arrangement provides additional mixing time for ammonia in the bulk gas and assists distribution of the ammonia gas across the catalyst face. It also allows for an operating temperature at the SCR catalyst that is in the optimum performance range for lower cost vanadium based catalysts versus high temperature zeolite based catalysts. The reaction of ammonia across the catalyst converts the NOx to elemental nitrogen which then travels with the bulk flue gas through additional heat exchangers (25-29) in the HRSG and is ultimately exhausted through an exhaust stack to the atmosphere.

In certain applications, gas flow conditioning devices like baffles, mixers or perforated plates can be installed upstream of the SCR catalyst (35) to improve gas flow distribution and mixing of the injected reagent into the primary gas flow before the SCR catalyst (35). Computational fluid dynamics modeling techniques can be useful in selecting the location and type of device for a given application.

In other cases, the slip stream can be withdrawn after the third section of the heat exchanger (25) in the HRSG where the temperature is 513° F. This allows a lower cost fan or blower (43) to be used due to the lower temperature and lower actual gas volume at the lower temperature. Disposed after the fan or blower is a heater section (46) of the continuous duct (42) which can be an electric heater, heat exchanger coil or burner that is used to raise the gas temperature to 750° F. at the inlet to the injection portion (44) of the duct.

Aqueous urea reagent is pumped from a storage tank (not shown) to injector (45) and injected into the injection portion of the continuous duct (42) for decomposition and gasification in the decomposition portion (50) of the continuous duct (42) and subsequent injection through the AIG (30). In cases where the slip stream is withdrawn after the second heat exchanger (23) and SCR catalyst (35) at a full load temperature of 763° F., the supplemental heater or burner arrangement (46) can be used to maintain a 750° F. gas temperature at the injection duct during lower load operation when the gas temperature after the SCR is below 750° F.

In both of the above approaches no heat exchanger surface is bypassed to create the slip stream and the residence time from the point of urea injection to the AIG outlet can surprisingly be maintained under 1 second, thus reducing the cost and size of the urea decomposition equipment.

In another embodiment, flue gas from after the third heat exchanger (25) section at a temperature of 513° F. can be blended with flue gas after the first heat exchanger (21) at 870° F. to form a combined slip stream at a temperature of 600° F. to 750° F. that is ducted to the fan or blower (43) and heater (46) section of the continuous duct (42). Dampers and actuators known to those skilled in the art can be used to form the combined slipstream.

Although the invention has been described with reference to a particular arrangement of parts, features and the like, these are not intended to exhaust all possible arrangements or features, and indeed many modifications and variations will be ascertainable to those of skill in the art.

What is claimed is:

1. A method for reducing NOx emissions from an exhaust of a combined cycle gas turbine equipped with a heat recovery boiler, said method comprising the steps of:
   providing a plurality of heat exchanger sections spatially separated from one another in a direction of flow of primary exhaust gases, said plurality of heat exchanger sections comprising at least a first heat exchanger section and a second heat exchanger section;
   providing a catalyst effective for NOx reduction downstream of the second heat exchanger section;
   providing an injection grid downstream of the first heat exchanger section and upstream of the second heat exchanger section;
   causing the primary exhaust gases to flow over the first heat exchanger section, then the injection grid, then the second heat exchanger section and then the catalyst;

withdrawing a slip stream of the primary exhaust gases from a location downstream of the catalyst at a temperature of 500° F. to 900° F. and through a fan or blower to a continuous duct;

injecting aqueous based reagent into the slip stream flowing through the continuous duct such that the aqueous based reagent decomposes to ammonia gas;

injecting the slip stream, carrying the ammonia gas, into the flow of the primary exhaust gases through the injection grid, whereby a mixture of the slip stream, carrying the ammonia gas, and the primary exhaust gases are caused to flow over the catalyst, and wherein the gases withdrawn in the slip stream are maintained such that a temperature of the gases in the continuous duct is kept above 650° F. immediately downstream of the point of reagent injection;

wherein a residence time in the continuous duct is less than one second from the point of reagent injection into the continuous duct to the point of injecting the slip stream, carrying the ammonia gas, into the flow of primary exhaust gases.

2. The method of claim 1, wherein a portion of the slip stream comprises gases repeatedly re-passed over the second heat exchanger section.

3. The method of claim 2 wherein no heat exchange section of the combined cycle gas turbine is bypassed by the gases withdrawn in the slip stream.

4. The method of claim 1 wherein the temperature of the gases in the continuous duct is kept above 650° F. by way of heating the gases withdrawn in the slip stream upstream of the point of reagent injection and downstream of the fan or blower.

5. The method of claim 1, wherein the aqueous based reagent is a 25-50% aqueous solution of urea.

6. The method of claim 1, wherein the aqueous based reagent is an aqueous based ammonia solution of 19-30%.

7. A method for reducing NOx emissions in an exhaust of a combined cycle gas turbine equipped with a heat recovery boiler and a catalyst effective for NOx reduction, wherein a slip stream of hot flowing exhaust gases is withdrawn from a primary gas flow after the catalyst at a temperature of 500° F. to 900° F. and directed through a fan to a continuous duct into which an aqueous based reagent is injected for decomposition to ammonia gas and the outlet of the continuous duct is connected to an injection grid positioned in the primary gas flow for injection of ammonia gas into the primary gas flow at a location upstream of the catalyst, wherein the gases withdrawn in the slip stream are maintained such that the gases in the continuous duct maintain a temperature above 650° F. immediately downstream of the point of reagent injection, and wherein a residence time in the continuous duct is less than one second from the point of reagent injection into the continuous duct to the point of injecting the slip stream, carrying the ammonia gas, into the primary gas flow.

8. A combined cycle gas turbine equipped with a heat recovery boiler and having reduced NOx emissions, said system comprising:

a plurality of heat exchanger sections spatially separated from one another in a direction of flow of primary exhaust gases, said plurality of heat exchanger sections comprising at least a first heat exchanger section and a second heat exchanger section;

a catalyst effective for NOx reduction disposed downstream of the second heat exchanger section;

an injection grid disposed downstream of the first heat exchanger section and upstream of the second heat exchanger section;

wherein the first heat exchanger section, the injection grid, the second heat exchanger section and the catalyst are disposed such that the primary exhaust gases flow over the first heat exchanger section, then the injection grid, then the second heat exchanger section and then the catalyst;

a slip stream inlet positioned to withdraw a slip stream of the primary exhaust gases from a location downstream of the catalyst at a temperature of 500° F. to 900° F. and through a fan or blower to a continuous duct;

an injector positioned in the continuous duct, said injector injecting aqueous based reagent into the slip stream flowing through the continuous duct such that the aqueous based reagent decomposes to ammonia gas;

wherein the gases withdrawn in the slip stream are maintained such that a temperature of the gases in the continuous duct is kept above 650° F. immediately downstream of the point of reagent injection;

wherein the slip stream, carrying the ammonia gas, is injected into the flow of the primary exhaust gases through the injection grid, whereby a mixture of the slip stream, carrying the ammonia gas, and the primary exhaust gases are caused to flow over the catalyst; and wherein a residence time in the continuous duct is less than one second from the point of reagent injection into the continuous duct to the point of injecting the slip stream, carrying the ammonia gas, into the flow of the primary exhaust gases.

9. The system of claim 8, wherein a portion of the slip stream comprises gases repeatedly re-passed over the second heat exchanger section.

10. The system of claim 9 wherein no heat exchange section of the combined cycle gas turbine is bypassed by the gases withdrawn in the slip stream.

11. The system of claim 8 further comprising a heater disposed in the continuous duct upstream of the point of reagent injection and downstream of the fan or blower.

12. The system of claim 8, wherein the aqueous based reagent is a 25-50% aqueous solution of urea.

13. The system of claim 8, wherein the aqueous based reagent is an aqueous based ammonia solution of 19-30%.

* * * * *